United States Patent [19]

Hauer

[11] Patent Number: 4,771,422
[45] Date of Patent: Sep. 13, 1988

[54] PRIORITY USER PROTECTION IN MULTIPLE PRIORITY SWITCHING SYSTEMS

[75] Inventor: Werner Hauer, Parsippany, N.J.

[73] Assignee: ITT Corporation, Defense Communications Division, Nutley, N.J.

[21] Appl. No.: 937,853

[22] Filed: Dec. 4, 1986

[51] Int. Cl.$^4$ .......................... H04J 3/02; H04J 3/06
[52] U.S. Cl. .................................... 370/85; 370/100; 370/108; 380/23
[58] Field of Search .................. 370/85, 100, 108; 375/2.1; 340/825.5, 825.51; 380/35, 23

[56] References Cited

U.S. PATENT DOCUMENTS

| | | | |
|---|---|---|---|
| 4,426,713 | 1/1984 | Shimizu et al. | 370/108 |
| 4,451,819 | 5/1984 | Beckenhauer | 370/108 |
| 4,562,573 | 12/1985 | Murano et al. | 370/108 |

Primary Examiner—Douglas W. Olms
Assistant Examiner—Frank M. Scutch, III
Attorney, Agent, or Firm—Robert A. Walsh; Thomas N. Twomey; Mary C. Werner

[57] ABSTRACT

There is disclosed a technique for interfacing various subscriber groups having different security levels which subscribers are associated with the same telephone system. According to this invention, every terminal element or subscriber has a programmable frame delay for the out and in registers associated with the switching network. In this manner, each subscriber of the same priority will receive the same delay on the transmit and receive paths. This delay is accommodated by means of an up or down counter which is inserted in the frame sync signal to the appropriate input and output registers. The input and output registers are controlled according to the priority of the subscriber, such that there is a complementary delay in the receive path and the transmit path so that the total delay for the same priority subscriber is equivalent to one complete frame. In this manner, only subscribers of the same priority can communicate with each other. In the event that a subscriber of a different priority is misconnected to another subscriber of a different priority, then these subscribers will not be able to communicate due to the fact that the information received will be unintelligible based on the different frame delays. Thus, the technique presented herein permits false connection to be intelligible only for users of the same precedence level. A false connection to a user of a different precedence level will be completely unintelligible.

20 Claims, 2 Drawing Sheets

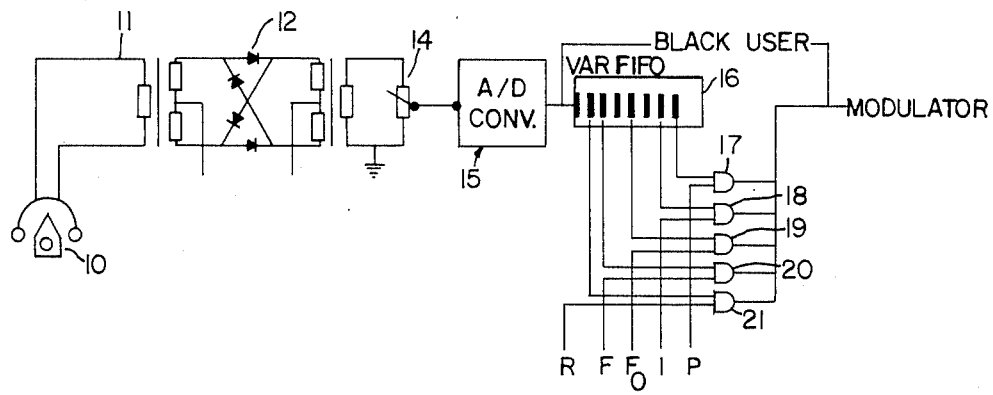

PRIORITY USER PROTECTION IN MULTIPLE PRIORITY SWITCHING SYSTEMS

BACKGROUND

This invention relates to switching systems in general and more particular to switching systems which employ groups of different priority subscribers. As is well known in military switching systems and other secured type of switching systems, there exists groups of different priority subscribers. As such, these subscribers have different security levels and different priorities. A common example of such a switching system is widely employed by the military and, for examples, use red phone subscribers, which may be analog subscribers, as well as black phone subscribers, which may be both analog and digital subscribers. As such certain red phone subscribers, for example, may be higher priority subscribers than other red phone subscribers. In this manner certain telephone subsets associated with one priority subscriber are connected to various modems or encryption equipment whereby the telephone transmissions are decoded or converted to various forms which include scrambling or other encoding or encryption techniques to render secure communications thereby assuring that other unauthorized subscribers receive unintelligible data or that conventional eavesdropping techniques cannot be employed. As one can ascertain, certain conversations which may emanate over such switching systems are extremely confidential and hence should be guarded against by eavesdropping in regard to unauthorized users. In any event, as indicated, most of these switching systems utilize subscriber groups with different security levels. These subscriber groups are able to contact one another through a master switching matrix or a switching network. In this manner it is possible for STET to occur due to the common connections through the switching matrix. One practice of the prior art is to class mark subscribers in distinct groups and to prevent one group from calling another. In any event, this is not sufficient as cross talk and false connections due to normal operation of the switching matrix can compromise a critical call if no protection against it is provided.

· The physical separation of terminal equipment tends to minimize the danger of cross talk, however, as both user groups must use the common switching network the danger of false routing still exists. Such switching networks utilize PCM or pulse code modulated switching systems and hence offer the opportunity to use the systems encoding/decoding circuits to process the signals of the different user groups. Selective processing makes it more difficult for one user group to understand the signals of the other. In any event, it does not in any manner effect the signal transmission through the switching network.

Hence the prior art proposed a partitioning of a secured switch into black and red groups by using separate class marks for the different groups. This allows the restriction of call set ups to users of the same class only. In any event, all switching systems will provide certain numbers of false connections. Hence, the protection against false connections or the transfer of classified information to unauthorized users is a critical problem. Thus, in order to avoid the communications of such critical information, the prior art envisioned many different proposals. According to one aspect, the users of the red group employ in their PCM codecs a reversed algorithm. Essentially, this implies a special PCM codec chip that is required for all red subscribers and each of the red line circuits must be equipped with a special codec chip. In this manner it requires that such common elements, such as switching system operators, must have two separate connections which is one for the red subscriber and one for the black subscriber. While the technique allows the unimpaired use of the switching network because only the voice data element of the transmission packet is changed, it requires different codecs or chips in each of the lines. This concept allows the transposition of data in the bit stream to prevent an authorized user from reconstructing and understanding a misrouted message. Similarly, a digital user with a data terminal will also receive unintelligible information if, in fact, he is improperly connected to an unauthorized line. In any event, it is understood that non-sequential connections, such as only connections between red subscribers and such as only connections between black subscribers, are relatively expensive to implement and to guard against.

It is therefore an object of the present invention to provide a simplified approach to prevent misdirected messages from being understood by different priority subscribers in a switching system.

It is a further object of this invention to provide a simple and inexpensive approach to prevent unauthorized subscribers from receiving messages that can be reconstructed and which may contain critical data.

BRIEF SUMMARY OF THE INVENTION

This invention provides a separation between various priority subscribers in a switching system in which every terminal element, as a subscriber, a trunk or an operator, has a programmable frame delay for the out and in register of the common switching path. An up or a down counter is inserted in the frame sync signal to the registers. The preset for the up and the down counter are distributed via the control path after the dial detector has recognized the priority level or precedence and compared it with the class mark of the subscriber. The user without precedence or priority operates without frame delays as they are the most common user and hence constitute the majority of users in the switching system.

Users with a high priority level or precedence have different frame delays for each level of priority. A flash precedence user is assumed to be delayed two-eighths of a frame on the transmit side and six-eighths of a frame on the receive side. This priority user will experience a full frame delay which amounts to 125 microseconds. The full frame delay, as indicated above, is a delay of two-eighths of a frame on the transmit side and six-eighths of a frame on the receive side. This scheme prevents one from obtaining intelligible information due to a false connection or a misrouted call implemented by the switching system. A false connection to users of different priority levels is therefore rendered unintelligible by the system described above.

BRIEF DESCRIPTIONS OF FIGURES

FIG. 1 is a simple block diagram depicting transmit path circuitry employing apparatus according to this invention;

FIG. 2 depicts a series of timing diagrams showing increments of delay which are indicative of different priority subscribers;

DETAILED DESCRIPTION OF FIGURES

Figure 3:
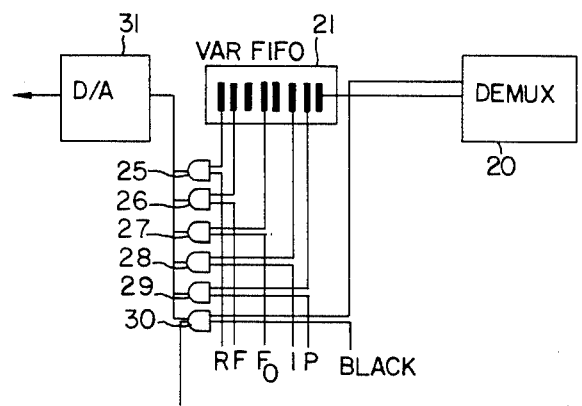
FIG. 3 is a simple block diagram depicting receive path circuitry according to this invention.

Referring to FIG. 1 there is shown a simplified block diagram employing a system according to this invention.

FIG. 2 shows a series of timing diagrams depicting the PCM bits which would be inherent in operation of this system and which are shown as provided for each of the different priority subscribers. As seen in FIG. 1, a telephone subset 10 is by means of suitable circuitry coupled to the primary winding of a transformer 11. The transformer 11 is coupled to a suitable modulator circuit 12 wherein the modulator circuit consists of a series of diodes. The modulator circuit 12 is commonly known as a ring modulator or a balanced modulator and serves to convert the analog information obtained via subset 10 into modulated information at a higher frequency. The output of the modulator 12 is directed through a suitable impedance device 14, coupled to the secondary winding where the modulated audio information is applied to input of an analog to digital converter 15. The analog to digital converter 15 is a typical commercially available device which serves to convert the analog information into a PCM signal. Essentially pulse code modulation or PCM involves concepts different from those of analog systems, namely sampling quantizing coding, time division multiplex, and regeneration. These concepts are well known and many texts have been dedicated to the techniques of pulse code modulation. See for example a text entitled "Transmission Systems for Communications" published by Bell Telephone Laboratories Incorporated, 3rd Edition 1964. See for example Chapter 24 entitled "Introduction to Pulse Code Modulation". Essentially, in most PCM systems one can represent a different analog amplitude by a binary code. Essentially, in such systems a common way of representing an analog amplitude is to provide seven digital bits of information regarding each analog sample. Such systems employ time division multiplexing which consists of interspersing samples in time from several voice channels. Essentially this technique is also well known and the interleaving of signals on a time basis is referred to as time division multiplexing. In such systems, samples are fed into an appropriate encoder circuit which produces at its output a PCM signal. At the receiving end the inverse functions of decoding and demultiplexing are conventionally performed. Time division multiplex involves switching at precisely fixed times so as to make possible the separation of messages at the receiver. The sampling interval T associated with the time division multiplexing is the time between successive samples of the message voltage in a channel. A frame represents a set of signals corresponding to a complete procession of the sampler. The frame rate (which is numerically equal to the sampling rate) is a reciprocal of the sampling interval. As indicated above, the above-noted text book has many examples of typical PCM transmission systems. Such systems are widely employed and extremely well known and essentially the objectives and aspects of the following description rely on a PCM signal transmission.

For example, an 8 bit PCM transmission can be divided in 8 different transmission levels, each one for a user group. This will allow one to have a level for each of the five precedence or priority levels of the secure subscriber group plus one for the non-secure user group, with two additional levels to spare. As can be seen from FIG. 1 the output of the analog to digital converter 15 is coupled to a register 16 which is a variable FIFO register. An FIFO register implies a first in, first out register. Such registers are widely known and commercially available as integrated circuit chips. As seen in the figure, the register has multiple taps which essentially implies a tap for each particular stage and as the data is directed through the register the first data bit in will be the first data bit out. Each tap has a given delay wherein a delay of one-eighth to seven-eighths can be obtained. Coupled to the taps of the register are a series of gates designated as 17–21. Each gate, which is shown as AND gates, has one input coupled to a suitable tap on the register 16 to obtain a predetermined delay and has another input designated by the reference numerals as R, F, $F_0$, I and P. As one can ascertain from FIG. 2, there are various priorities of red users which, for example, would be indicative of the user assigned to subset 10 of FIG. 1. Hence as seen from FIG. 2A there is first a group of black users. As is seen, the data emanating from a black subset, which is also indicated in FIG. 1, is absolutely bypassed and does not enter the variable FIFO register 16. Hence the black user signal is completely undelayed and consists of conventional undelayed bits 1 through 8 which is indicative of the PCM transmission. In any event, as seen from FIG. 2 there are five levels of red users. As shown in FIG. 2B there is a red user, which is a routine user, designated by the letter R. In FIG. 2C there is shown the data diagram depicting the PCM output of a red flash user designated by the letter F. In FIG. 2D there is shown a user designated as a flash override user designated by the term $F_0$. In FIG. 2E there is shown the data emanating from a red intermediate user designated by the reference I and in FIG. 2F there is shown the data output of a red precedence user designated by the letter P. Again referring to FIG. 1, as can be seen each of the AND gates 17–21 has one input associated with one particular priority user and another input associated with a given delay. Hence, gate 17 has one input coupled to a particular tap of the register 16 and another input coupled to a terminal designated as P. Gate 18 has one terminal coupled to a different tap of register 16 and one terminal coupled to the terminal designated as I. In a similar manner, gate 21 has one terminal coupled to a tap on the register 16 and another terminal coupled to the terminal designated as R.

In this manner if subscriber 10 were a routine red user then terminal R would be enabled and gate 21 would always be active for any transmission emanating from subscriber 10. In the same manner, if subscriber 10 were a flash user then gate 20 would be employed having one input coupled to a different tap on the FIFO 16 and another input terminal coupled to the terminal designated as F indicating a flash user. As can be seen from FIG. 2, the bit stream of FIG. 2A of a black user remains undelayed. This is also ascertained by referring to FIG. 1 where a black user bypasses the register 16.

Each precedence level, which is each class of the red users designated by FIGS. 2B-2F, has differently delayed bit groups so that a given priority red user can only understand a source with the same delays. This assures that false routing within the red switch will not be understandable to a user of a different precedence or priority level. Thus, as can be seen from FIG. 2B, a red routine user has a bit delay of one-eighth of a frame while a red flash user has a bit delay of two-eighths of a frame, and so on.

Referring to FIG. 3 there is shown a simple block diagram of a receive path for the switching system. As one can see, there is shown a demultiplexer 20 which essentially is a conventional component and serves to demultiplex or separate out the various PCM data signals. These signals are again directed to a corresponding register 21 which is in fact a first in, first out (FIFO) register. The register 21 is again associated with multiple taps and there is shown a second series of AND gates designated as gates 25–30. The outputs of all the gates are connected in common as those of FIG. 1 and are directed to the input of a digital to analog converter 31. Essentially the digital to analog converter 31 takes the digital information emanating from each gate and converts it back to an analog signal for transmission to a suitable subset. As seen in FIG. 3, each gate is associated with a different priority level and further includes a gate 30 which is associated with a black subscriber. Hence, this gate 30 would be activated for a black subscriber who will then receive from the demultiplexer 20 a signal having no delay, as indicated above the bit stream of the black user remains completely unchanged. In any event, the PCM signal directed to a red user with a given priority, as indicated above, is delayed to a full cycle by adding the complement delay in the receive path. This essentially will lead to a one frame delay for red users and to no delay for black users. In any event, a corresponding red user will receive its exact complement due to the transmit circuit of FIG. 3 and will receive, basically as shown in FIG. 1, with a particular frame delay to assure that the total delay between receive and transmit is equal to one frame delay for each priority user. Thus, the delay afforded in the receive and transmit paths for each red user is such that the total delay equals one frame. As can be seen again from FIG. 2, the red routine user has a one-eighth of a frame delay, in the transmit path. In any event, the red user in the receive path would receive a signal which is delayed by seven-eighths of a frame as indicated by gate 25 associated with a routine red user designated as R. In a similar manner, each of the other users also receive an appropriate complementary delay to allow each of the red users of different priority to therefore receive one full frame delay and hence be able to exactly communicate with another red user of the same priority. As explained above, if one priority level red user is misconnected to another different priority red user, he will not be able to understand the transmission due to the incompatible frame delays. In this manner such communications will be completely unintelligible to different priority users.

Using the same philosophy as designated above, a black user has no delay and hence if any black user gets connected to any red user there will be at least a one-eighth of a frame delay which will render all communications unintelligible as well. In this manner, any inadvertent connection made by the switching system, due to a malfunction or some other error, will result in unintelligible data being connected to different priority subscribers. Hence, only priority subscribers of the same exact priority will be able to communicate with one another due to the fact that the total delay afforded by both the receive and transmit paths equals one full frame which, in a conventional PCM system, is equivalent to 125 microseconds.

Figure 4:
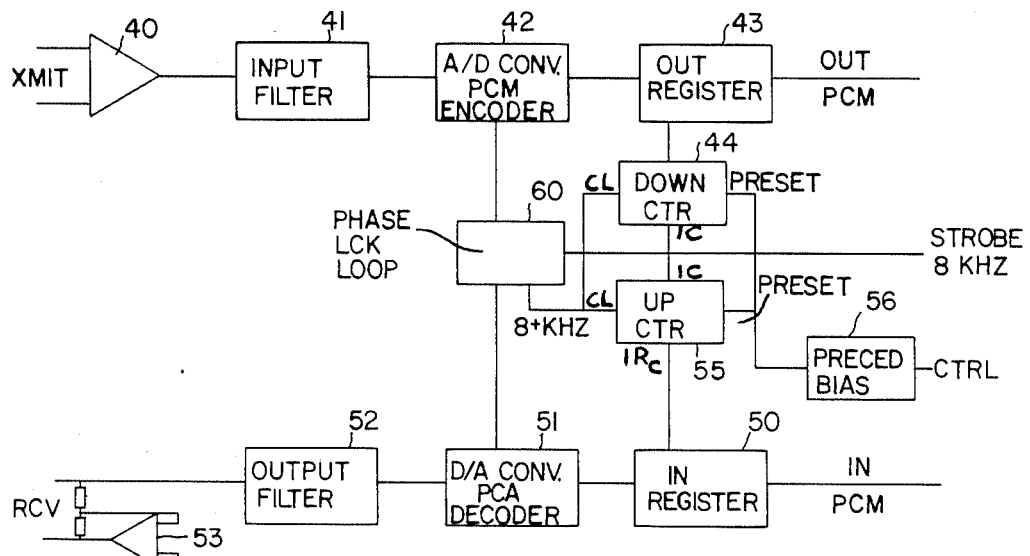
FIG. 4 is a detailed block diagram depicting a transmit receive path circuit according to the principals of this invention.

Referring to FIG. 4 there is shown one embodiment of the above described apparatus. Shown in FIG. 4 is a transmit and a receive side. Essentially the transmit side from a line, such as the line associated with a subscriber 10, is coupled to a isolation amplifier 40. The output of the isolation amplifier receives the analog signal from a red subscriber of a given priority. This analog signal, as shown in FIG. 4, is conventionally a two wire signal. For secure switching systems, one is concerned with four wire switching to further reduce the effects of capacitance and misbalance in the switching network. The output of the isolation amplifier 40 is conventionally directed to an input filter 41 which essentially serves to limit the analog bandwidth emanating from the particular red subscriber. The output of the filter 41 is directed to an analog to digital converter 42. The analog to digital converter 42 is a typical available component and serves to convert the input analog information into a stream of eight bit PCM digital information as for example the analog to digital converter depicted in FIG. 1. The output from the analog to digital converter is directly connected to an output register 43 which essentially operates similarly to the register 16 depicted in FIG. 1. The output register 43 receives its clocking information from a down counter 44, as will be further explained. In any event, the output of register 43 is a PCM signal which has a particular delay in regard to the priority of the red user, as for example the five priorities shown in FIG. 2B. In any event, the receive side receives the input PCM signal from the switching network, which is directed to register 50. Register 50, as will be explained, operates similarly to register 21 of FIG. 3. The output of register 50 is directed to a digital to analog converter 51 which essentially takes the incoming PCM signal emanating from register 50 and converts that signal to an analog signal which is then applied to the output filter 52 and transmitted directly to the receive line of the subscriber subset.

Shown coupled to the receive line is a terminating amplifier 53 which sends a proper signal level to the receive terminals of this subscriber terminal. As again can be ascertained from FIG. 4, the register 50 receives its timing from an up counter 55. Both the up counter 55 and the down counter 44 receive preset information from a precedence bias circuit 56. Essentially the bias circuit 56 is in fact analogous to the series of gates shown in FIG. 1 and FIG. 3. The control signal to the bias circuit can be one of six different signals decoded by the bias circuit and indicative of the subscriber priority, associated with the line circuit of FIG. 4. Thus the control is a signal indicating a black user, a red routine user (R), flash (F), flash override ($F_O$), intermediate (I) or precedence (P). Hence, the output of the precedence bias circuit presets both the down counter and the up counter to a predetermined value which essentially provides a delayed signal to the output register 43 equivalent to, for example, two-eighths of a frame for a flash override user, while providing a delayed signal to the input register 50 associated with the same line circuit of six-eighths of a frame, thereby giving the entire subscriber associated with the line circuit of FIG. 4 a total delay of one full frame. This is accommodated by taking the outputs of the up and down counter and making those outputs part of a phased locked loop designated by reference numeral 60. The phase locked loop 60 supplies the suitable timing signals for the analog to digital converter 42 and for the digital to analog converter 51. This is necessary so that both converters operate in synchronism with each other and according to the predetermined delays associated with the input and output registers as 53 and 50. In this manner, the entire operation of the circuit is exactly ascertained for each priority user. As one can understand, the precedence bias circuit 56 functions via the control input to determine what the particular frame delay is to be, both on the transmit and receive side, and directs the exact clock signals to the output register 43 and the input register 50 so that one is exactly the complement of the other. Accordingly, the phase locked loop also operates to control the timing to the analog to digital converter 42 and to the digital to analog converter 51.

From the above example it is immediately understood that the frame reference pulse, which is essentially determined by the strobe input to the phase locked loop, is delayed in increments of one-eighth of a cycle due to the outputs of the down counter 44 and the up counter 55, both of which are preset by the precedence bias circuit 56 according to the particular type of line associated with the transmit and receive paths or the line circuit depicted in FIG. 4. The transmit and receive side use the up and down counters to complement each other, achieving one total frame delay. Thus, a two increment delay on the transmit will lead to a six increment delay on the receive, totaling eight increments or a full frame delay.

In a similar manner, a three increment delay on the transmit will lead to a five increment delay on the receive, and so on. In this manner, each of the priority subscribers will receive a complementary delay on both the transmit and the receive side indicative of the type of subscriber that is being accommodated by the particular line circuit. As indicated above, a black subscriber will not utilize the circuitry due to the fact that black subscribers will experience no delay at all between transmit and receive. In this manner, it will be understood that due to the different frame delays on both receive and transmit sides, inadvertent connections connecting different priority subscribers to one another will be unintelligible due to the built-in frame delays and only the same priority subscribers will be able to communicate due to the fact that each of these subscribers is assured the same exact frame delay.

What is claimed is:

1. In a digital switching system employing a plurality of different priority subscribers any one of which can be connected to any other subscriber via said system wherein a first priority subscriber could communicate with a different priority subscriber, wherein each of said subscribers can receive and transmit digital data via said system wherein said data is transmitted and received according to a given number of bits at a predetermined frame signal rate, for preventing undesireable communications comprising:

first means coupled to the receive path of each subscriber of the same priority and operative to provide a given frame displacememt to receive digital signals according to said priority and with a frame displacememt equivalent to a predetermined fraction of said frame rate;

second means coupled to the transmit path of each subscriber of said same priority and operative to provide a complementary frame displacement to a transmitted digital signal whereby each subscriber of the same priority will experience a total frame displacement equal to one frame interval to enable communications only with another subscriber of the same priority.

2. The digital switching system according to claim 1 wherein said receive and transmit signals are PCM signals containing eight data bits.

3. The digital switching system according to claim 1 wherein one group of the same priority has a receive delay of one-eighth of a frame and a transmit delay of seven-eights of a frame, with a second group having a receive delay of two-eighths of a frame and a transmit delay of six-eighths of a frame and so on, to assure that each group has a total delay between transmit and receive of one frame.

4. The digital switching system according to claim 1 wherein said first means includes a first register having multiple stages for receiving a received digital signal and first gating means connected to said first register to gate said signal out at said given delay.

5. The digital switching system according to claim 4 wherein said second means includes a second register having multiple stages for transmitting a transmitted signal and second gating means coupled to said second register for gating said transmitted signal out at said complementary delay.

6. The digital switching system according to claim 4 wherein said first gating means includes an up counter responsive to said priority to provide a preset value according to said priority indicative of said receive delay.

7. The digital switching system according to claim 6 wherein said second gating means includes a down counter responsive to said priority to provide a preset value according to said priority indicative of said transmit delay.

8. The digital switching system according to claim 4 wherein said first register is a variable first-in, first-out (FIFO) register.

9. The digital switching system according to claim 5 wherein said second register is a variable first-in, first-out (FIFO) register.

10. The digital switching system according to claim 1 wherein said first and second means are responsive to said frame rate to provide said delays according to said rate.

11. The digital switching system according to claim 10 wherein said first means includes a digital to analog converter coupled to a phase locked loop which loop is controlled by said frame rate signal.

12. The digital switching system according to claim 11 wherein said second means includes an analog to digital converter coupled to said phase locked loop and controlled by said frame rate signal.

13. The digital switching system according to claim 1 wherein said switching network includes at least five different priority subscriber groups with each of said groups having a different receive and transmit delay but each of said delays in each group equal to a one frame delay whereby a first group has a receive delay of two-eighths and a transmit delay of six-eighths of a frame, with another group having a receive delay of three-eighths of a frame and a transmit delay of five-eighths of a frame and so on.

14. A method of preventing unauthorized communications between different priority subscribers all of which interface via a common digital data switching network allowing subscribers to receive and transmit data, wherein a subscriber of a given priority may be connected to a subscriber of another priority, said method operative to prevent said different priority connected subscriber to eavesdrop or communicate in spite of said connection, comprising the steps of:
  providing a given data delay for the receive path of the same priority subscribers as compared to different priority subscribers;
  providing a complementary data delay for the transmit path of said same priority subscribers as compared to said different priority subscribers, to assure that all subscribers of the same priority have the same delay between the transmit and receive paths to thereby only enable subscribers of the same priority to receive and transmit intelligible data to one another.

15. The method according to claim 14 wherein said common digital data switching network is a PCM transmission network.

16. The method according to claim 15 wherein there are at least five different priority groups of subscribers with each group having a different receive and transmit delay from each other group.

17. The method according to claim 16 further wherein said PCM transmission network is an eight bit PCM transmission which provides eight different transmission levels according to eight different priorities.

18. The method according to claim 14 further including at least one group of subscribers having no delay between the transmit and receive paths.

19. The method according to claim 14 wherein said receive and transmit delays are based on the frame rate of said digital switching system with each delay being a specified fraction of said frame rate.

20. The method according to claim 14 wherein some of said subscribers are analog subscribers with other subscribers being digital subscribers.

* * * * *